US008734027B2

(12) United States Patent
Zoss et al.

(10) Patent No.: US 8,734,027 B2
(45) Date of Patent: May 27, 2014

(54) COUPLING FIELD ADAPTER

(75) Inventors: Jeremy K. Zoss, San Antonio, TX (US);
Thomas E. Lyons, Jr., Rio Medina, TX (US); Richard L. Simmons, Leander, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 71 days.

(21) Appl. No.: 13/389,522

(22) PCT Filed: Aug. 26, 2010

(86) PCT No.: PCT/US2010/046784
§ 371 (c)(1),
(2), (4) Date: Feb. 8, 2012

(87) PCT Pub. No.: WO2011/025870
PCT Pub. Date: Mar. 3, 2011

(65) Prior Publication Data
US 2012/0141084 A1 Jun. 7, 2012

Related U.S. Application Data

(60) Provisional application No. 61/237,872, filed on Aug. 28, 2009.

(51) Int. Cl.
*G02B 6/36* (2006.01)
*G02B 6/38* (2006.01)

(52) U.S. Cl.
USPC ............... 385/78; 385/70; 385/75; 385/139

(58) Field of Classification Search
USPC .................... 385/53, 70, 75–78, 135, 139
See application file for complete search history.

(56) References Cited

U.S. PATENT DOCUMENTS

| 5,923,805 | A | 7/1999 | Anderson |
|---|---|---|---|
| 6,471,414 | B2 | 10/2002 | Carberry |
| 6,550,977 | B2 | 4/2003 | Hizuka |
| 6,983,095 | B2 | 1/2006 | Reagan |
| 7,088,899 | B2 | 8/2006 | Reagan |
| 7,200,317 | B2 | 4/2007 | Reagan |
| 7,218,827 | B2 | 5/2007 | Vongseng |
| 7,369,741 | B2 | 5/2008 | Reagan |
| 2003/0169975 | A1* | 9/2003 | Anderson et al. ............... 385/76 |
| 2008/0145001 | A1 | 6/2008 | Beck |

* cited by examiner

Primary Examiner — Uyen Chau N Le
Assistant Examiner — Michael Mooney
(74) Attorney, Agent, or Firm — Janet A. Kling

(57) ABSTRACT

Disclosed is a coupling assembly for use in a telecommunication enclosure. The coupling assembly comprises an optical coupling mounted within the enclosure, a parking lot adapter, and a first optical fiber connector having a key on its housing. The parking lot adapter is axially aligned with and fitted to a first side of the optical coupling. The first optical fiber connector is inserted into the parking lot adapter and is movable between two stable positions. The two stable positions consist of a connected position and a disconnected position.

9 Claims, 7 Drawing Sheets

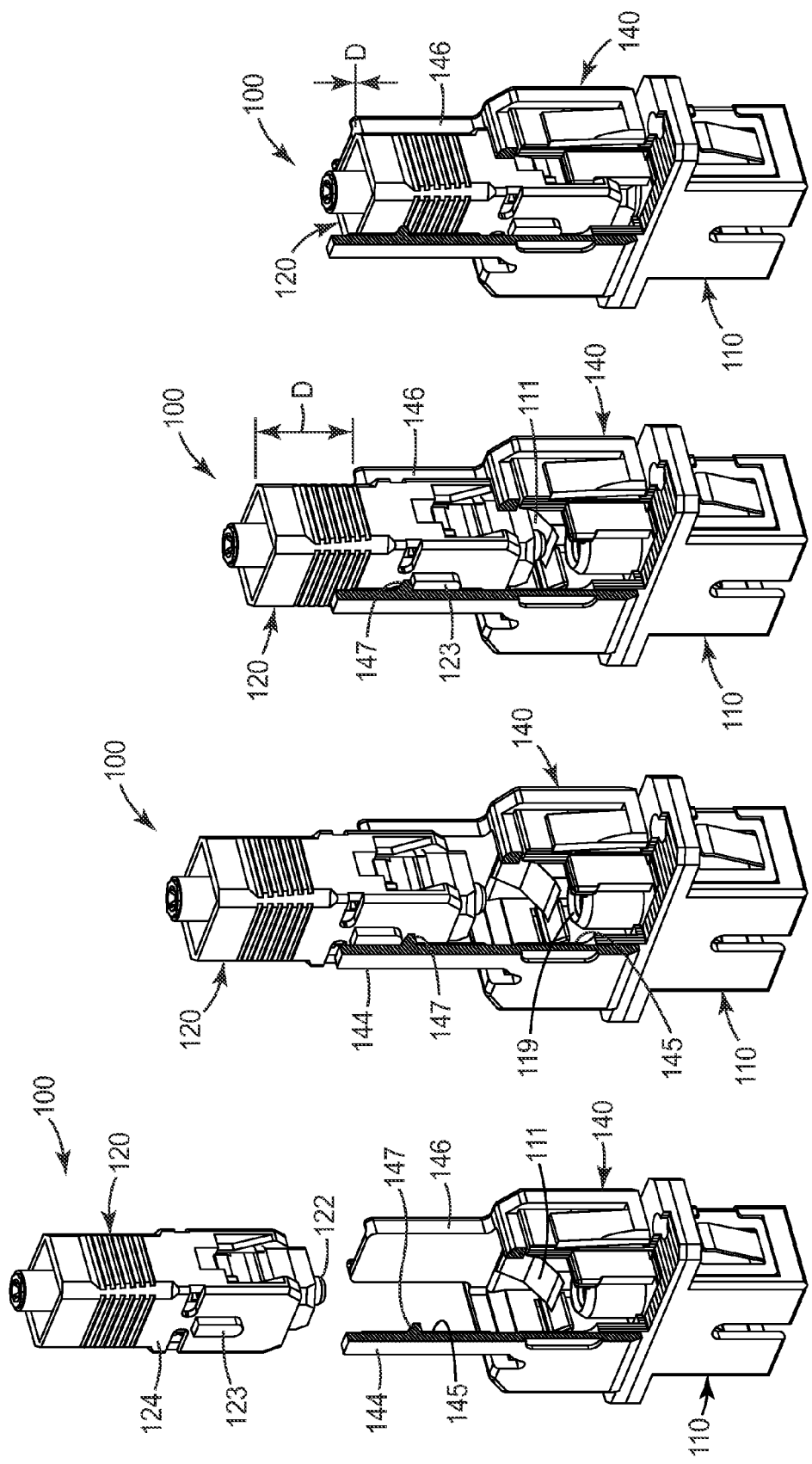

COUPLING FIELD ADAPTER

CROSS REFERENCE TO RELATED APPLICATIONS

This application is a national stage filing under 35 U.S.C. 371 of PCT/US2010/046784, filed Aug. 26, 2010, which claims priority to U.S. Provisional Application No. 61/237,872, filed Aug. 28, 2009, the disclosure of which is incorporated by reference in its/their entirety herein.

BACKGROUND

1. Field of the Invention

The present invention generally relates to communication interconnection and cross connection equipment and, more particularly, relates to an adapter to be used in conjunction with an optical coupling field which allows an optical connector to be held in one of two stable positions (e.g. a connected position and a disconnected position) within the coupling field.

2. Description of the Related Art

In the current field of communication access, fiber to the X (FTTX) systems are being increasingly deployed for broadband access. In these systems, fiber to the home (FTTH), fiber to the building (FTTB), and fiber to the curb (FTTC) are becoming the main choices of communication operators. In the FTTX link, an external wall mount box or enclosure or embedded wall mount communication enclosure is usually employed in a home, building or premise to receive communication devices, for example, including the optical network unit, that provide communication connection with an input optical fiber. Frequently, these types of enclosures are located in basements, communication closets or service hallways in premise locations.

In many premise locations such as multi-family dwelling units (e.g. apartment buildings) and office buildings, customers frequently move or are relocated, or the level of service required by a given customer may change. These changes in location or service level frequently require that service be connected or disconnected. Conventional enclosures typically comprise a patch panel for making service connections and a separate parking lot or connector storage location for storing the connections when no service is required for that particular line. This secondary connector storage location uses up valuable space within the enclosure.

Therefore, a demand exists for a way to efficiently store unused or disconnected data lines within a communication enclosure.

SUMMARY

According to a first aspect of the present invention, a coupling assembly for use in a telecommunication enclosure comprises an optical coupling mounted within the enclosure, a parking lot adapter, and a first optical fiber connector having a key on its housing. The parking lot adapter is axially aligned with and fitted to a first side of the optical coupling. The first optical fiber connector is inserted into the parking lot adapter and is movable between two stable positions. The two stable positions consist of a connected position and a disconnected position. The coupling assembly may further include a second optical fiber connector inserted into the second side of the optical coupling.

According to a second aspect of the present invention, a method is provided for efficiently storing an optical connector in a telecommunication enclosure. A coupling field, containing at least one optical fiber coupling secured in the coupling field, resides within the telecommunication enclosure to make service connections between the distribution fibers and the end customer. A parking lot adapter is attached to the first side of the optical fiber coupling. An optical fiber connector is inserted into the parking lot adapter to a disconnection position prior to installation of service. When a service connection is desired, the first connector is slid within the parking lot adapter to a connected position making an optical service connection with a second optical connector.

BRIEF DESCRIPTION OF THE DRAWINGS

The present invention will be further described with reference to the accompanying drawings, wherein:

FIGS. 4A-4D illustrate an exemplary method of use of the exemplary coupling assembly of FIG. 2;

Figure 1:
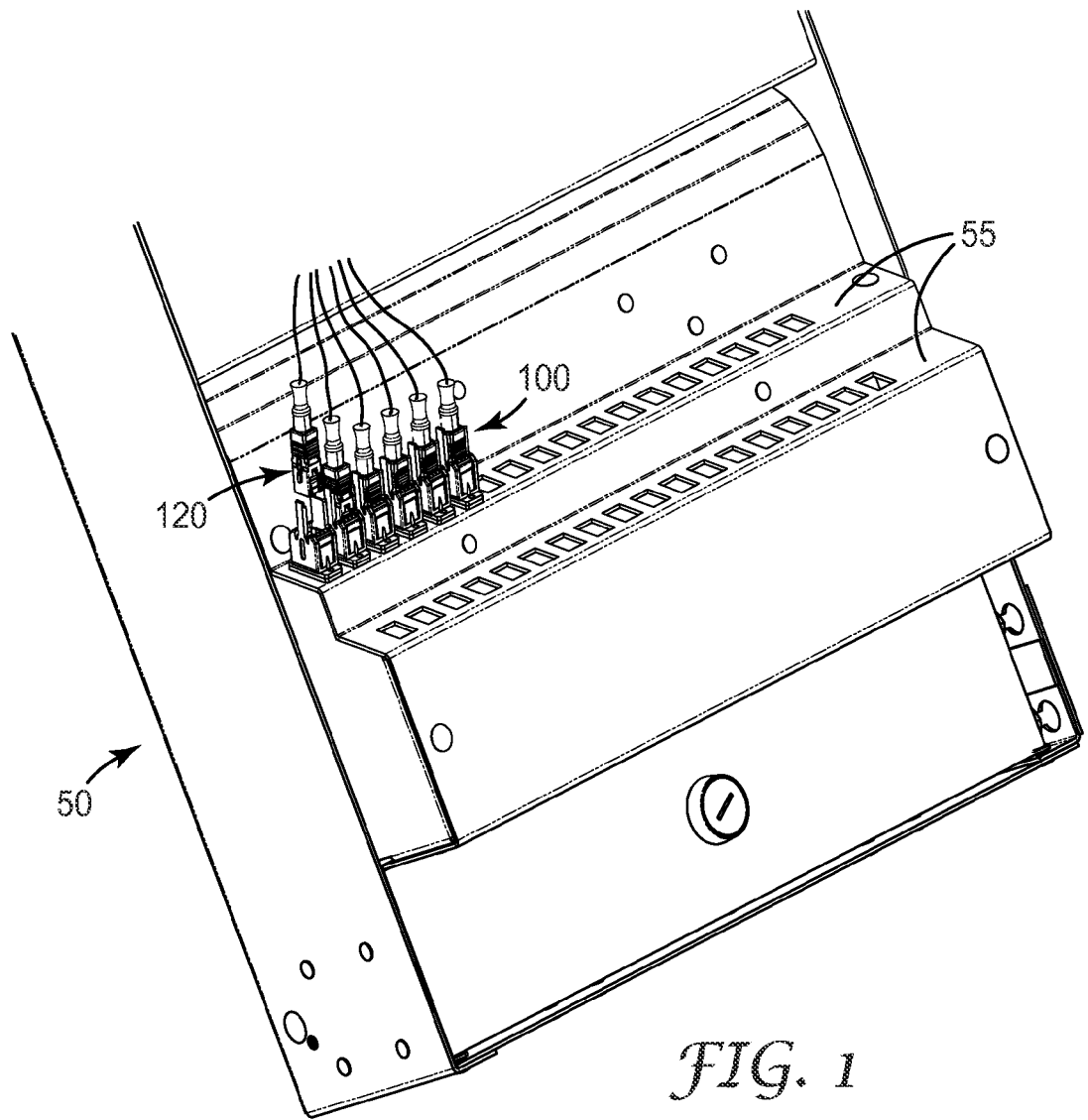
FIG. 1 is partial schematic view of a telecommunication enclosure which includes a parking lot adapter of the current invention fitted to an optical coupling in a coupling field.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to an optical fiber coupling assembly. In particular, the optical fiber coupling assembly of the exemplary embodiments can be readily installed and utilized in telecommunication enclosures for Fiber To The Home (FTTH) and/or Fiber To The X (FTTX) network installations.

FIGS. 2 and 3A-D shows an exemplary coupling assembly 100 that can be used in the coupling field of a telecommunication enclosure. The coupling assembly 100 includes an optical coupling 110, a parking lot adapter 140, and at least a first optical fiber connector 120. Alternatively, the coupling and the parking lot adapter may be integrally formed as a unitary body.

FIG. 1 shows an exemplary telecommunication enclosures 50 that can be used in FTTH and FTTX networks often contain optical fiber connectors 120 (e.g. SC, LC, MT, etc.) and the associated optical couplings. In some cases, such as in fiber distribution terminals (FDT) and fiber distribution hubs (FDH), there can be a large number of optical couplings arranged in a coupling field or connector field 55. The coupling field is often used to interconnect distribution side fibers to drop side fibers or cables.

When no service is required on a particular drop cable, the optical connector connected to that drop cable can be placed in a separate "parking lot," awaiting connection of service. This separate parking lot essentially doubles the required space in the telecommunication enclosure.

The coupling field adapter or parking lot adapter disclosed herein eliminates the need for a separate parking lot, thus saving valuable real estate within the enclosure. The parking lot adapter allows the optical connector to be held in the proximity of the optical coupling in one of two stable positions: a disconnected position and a connected position.

Figure 2:
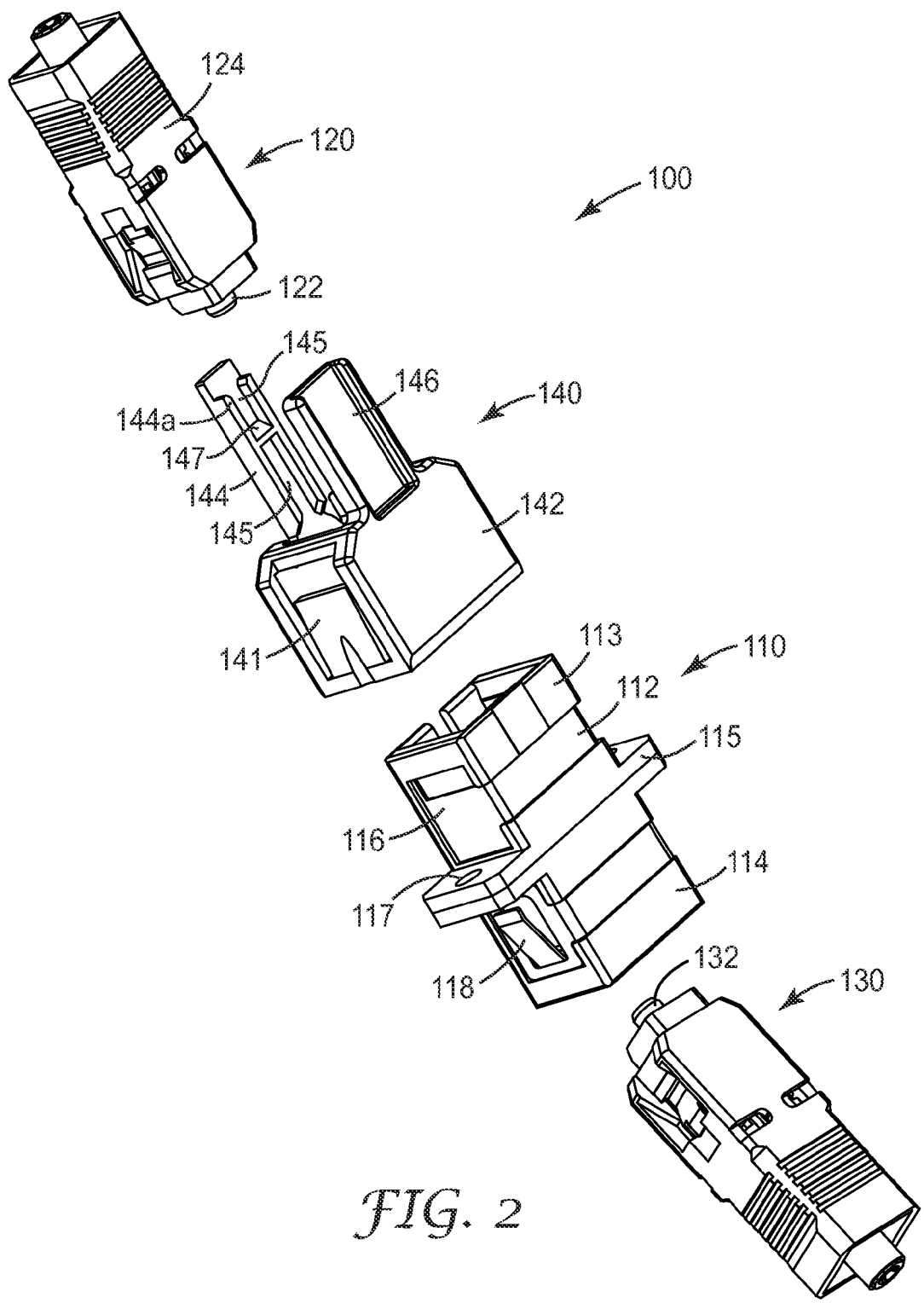
FIG. 2 in an exploded view of an exemplary coupling assembly that includes the parking lot adapter of the current invention.

Referring back to FIGS. 2 and 3A-3D, the optical coupling 110 has a coupling body 112 having a first side 113, a second side 114 and a central flange 115. The coupling body is a tubular member that is sized to accept a particular type of optical connector 120, 130 (e.g. SC, LC, FC and MT) within the first side 113 and the second side 114, respectively, of the optical coupling. In the example of FIG. 2, an optical coupling has an SC compatible format. A ferrule alignment sleeve 119 (see FIG. 4B) is supported within the coupling body 112 to align the ferrules 122, 132 of the first and second optical connectors 120, 130 inserted into the optical coupling 110. The optical couplings can include SC, LC, FC and MT coupling formats and are available from, for example, 3M Company, St. Paul, Minn., USA.

The optical coupling 110 can be secured in the coupling field by clip 118 or by at least one mechanical fastener inserted through opening 117 in flange 115. Additionally, the optical coupling may contain an internal shutter 111 (FIG. 4A), such as is available from SENKO Advanced Components, Tokyo, Japan.

The first and second optical fiber connectors 120, 130 that may be used in conjunction with the current invention can be single fiber connectors such as a SC, FC, or LC connectors, to name a few, and may be, for example, either a physical contact (PC) or an angled polished connector (APC) type of connector. Alternatively, the connectors may be multi-fiber style connectors such as MT, OGI, MTP or MPO connectors. Sample single fiber connectors include 3M™ No Polish Connector SC Plug, 3M™ Hot Melt LC Connector, and 3M™ CRIMPLOK™ ST SM 126 UM Connector. A sample multi-fiber connector includes 3M™ OGI multi-fiber connector, all of which are available from 3M Company (St. Paul, Minn.).

In an exemplary aspect, the first optical connector can have a key 123 (FIG. 4A) on its housing 124 which engages with the parking lot adapter 140 to position the connector in two stable positions. As described herein, a connector 120 can be placed into one of two stable positions within the adapter 140 (i.e. a disconnected position and a connected position).

The first optical fiber connector 120 may be attached to a drop cable or a patch cord (not shown) that when placed in a connected position will provide service to the customer. The second optical fiber connector 130 may be directly attached to a distribution fiber, may be disposed on the end of a pigtail which has been spliced onto the distribution fiber on a splice tray located in the telecommunication enclosure, or may placed be on the end of a pigtail which is connected to an optical splitter which has been spliced onto the distribution fiber on a splice tray within the telecommunication enclosure.

Referring back to FIG. 2, the parking lot adapter 140 is axially aligned with and fitted to a first side 113 of the optical coupling 110. The parking lot adapter 140 can include a base 142 that is configured to be slideably engaged over the first side 113 of optical coupling 110. The base includes a catch 141 which interacts with a detent 116 on the first side 113 of the coupling body 112 to secure the parking lot adapter to the optical coupling 110.

A first arm 144 and a second arm 146 can extend vertically away from the base 142 to support the first optical connector 120 when it is inserted into the parking lot adapter 140. In the exemplary embodiment shown in FIG. 2, the first and second arms can extend from opposite sides of the base 142 such that the arms 144, 146 can aid in aligning the first optical connector as it is inserted into the parking lot adapter 140 and later into optical coupling 110. The gap between the opposing arms permits the first optical connector to be grasped so that it can be moved between the two stable positions.

In an exemplary aspect, first arm 144 can include a slot 145 extending longitudinally along an internal surface 144a of the first arm. The slot 145 can accommodate the key 123 (FIG. 4A) on the first optical fiber connector 120 to provide additional alignment of the optical connector as it is inserted into the coupling assembly 100. In addition, slot 145 in the first arm 144 can include one or more stops 147 to hold the first optical connector 120 in the parking lot adapter and/or in one of a connected position and a disconnected position.

In an alternative aspect, the parking lot adapter can include an internal shutter (not shown) to block any light from the distribution fiber when the first optical connector is in a disconnected position.

Figure 3A:
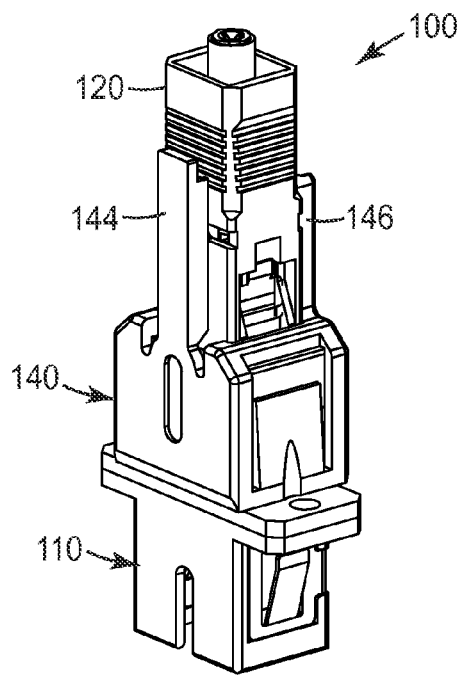
FIGS. 3A and 3B are two assembled views of the exemplary coupling assembly of FIG. 2, wherein the optical connector is in a disconnected position.
Figure 3B:
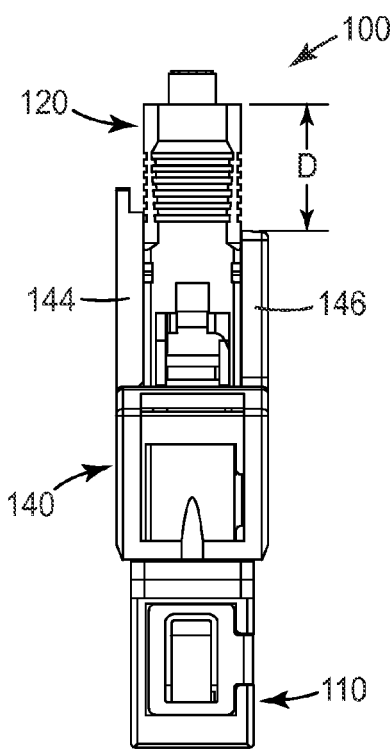

FIGS. 3A and 3B show the first optical connector 120 inserted into parking lot adapter 140 in the first of two stable positions (i.e. the disconnected position). When the second connector (not shown in these figures for simplicity) has been fully inserted into optical coupling 110 and the first optical connector 120 is in a disconnected position in the parking lot adapter, there is a space or separation distance between the fiber end faces of the first optical connector and the second optical connector within the coupling. The separation distance between the connector end faces is indicated in FIG. 3B as the distance, D, which corresponds to the separation distance between the end faces of the ferrules of the first and second connectors. D can be measured as the length that the first optical connector extends above the second arm 146 of the parking lot adapter 140. For example, when the second connector has been fully inserted into optical coupling 110 and the first optical connector 120 is in a disconnected position in the parking lot adapter 140, the separation distance prevents sufficient or viable light from entering the optical fiber held by connector 120 due to the numerical apertures of the optical fibers. When the separation distance is sufficiently large, the numerical aperture of the exit cone of light from the optical fiber held by the second optical connector is such that insertion loss prohibits viable transmission of the optical signal from the second optical fiber connector to the first optical fiber connector. In an exemplary aspect, the ends of the fibers held in the first optical connector and the second optical connector can be separated by several millimeters when the first connector 120 is in the disconnected position in the parking lot adapter 140.

Figure 3C:
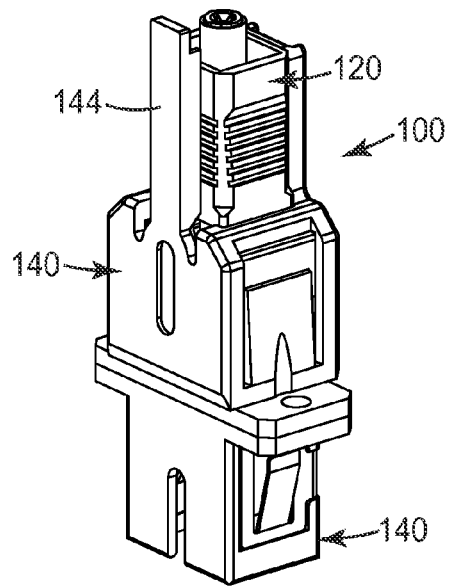
FIGS. 3C and 3D are two assembled views of the exemplary coupling assembly of FIG. 2, wherein the optical connector is in a connected position.
Figure 3D:
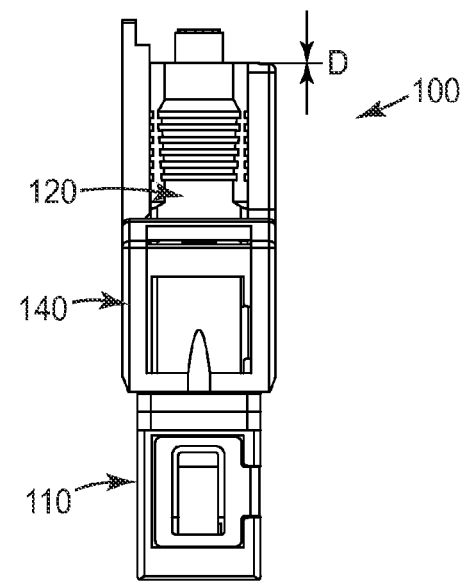

FIGS. 3C and 3D show the first optical connector 120 inserted into parking lot adapter 140 in the second of two stable positions (i.e. the connected position). In the connected position, the connector is pushed forward in the parking lot adapter such that ends of the ferrules 122, 132 of the first optical connector and second optical connector (not shown in the figures for simplicity) abut each other within the alignment sleeve of optical coupling 110 when the second optical connector is fully inserted into optical coupling 110. Thus, the separation distance between the ends of the optical fibers held by the first and second optical connectors approaches zero (e.g. as shown in FIG. 3D, the back end of the optical fiber connector is at the same height as the top edge of second arm 146). Thus, the second arm 146 can serve as a simple visual confirmation of the relative position of the first optical fiber connector 120 in the coupling assembly 100.

The space or gap between the first and second arms 144, 146 of the parking lot adapter 140 allows the craftsman to grip the first optical fiber connector 120 so that it may be pushed from the disconnected position to the connected position or pulled from the connected position to the disconnected position.

FIGS. 4A-4D show the insertion and use of the parking lot adapter 140 in the exemplary coupling assembly 100. FIG. 4A shows the coupling assembly 100 prior to insertion of the first optical connector 120 into the parking lot adapter. During initial installation of the telecommunication enclosure, the second optical connector (not shown) would be plugged into the second side of optical coupling 110 of the coupling assembly 100. Next, the first optical connector 120 would be positioned such that the key 123 on the optical connector housing 124 is placed in slot 145 on the first arm 144 of the parking lot adapter 140 as shown in FIG. 4B. The first optical connector 120 is pushed forward into the parking lot adapter until key 123 slips past stop 147 to rest in the disconnected position. In the exemplary aspect shown in FIG. 4C, the first connector stops moving forward when ferrule 142 of the first optical connector 120 contacts interior shutter 111 within the optical coupling 110. Stop 147 prevents the first optical connector 120 from slipping out of the parking lot adapter 140, even if the connector is disturbed. Application of an additional forward force causes the connector to slide further forward within the coupling assembly 100, pushing the internal shutter 111 out of the way. When the optical connector is fully inserted into the coupling assembly 110, the first connector is in a connected position and the optical signal can be transmitted to the customer establishing the service connection as shown in FIG. 4D.

Figure 5:
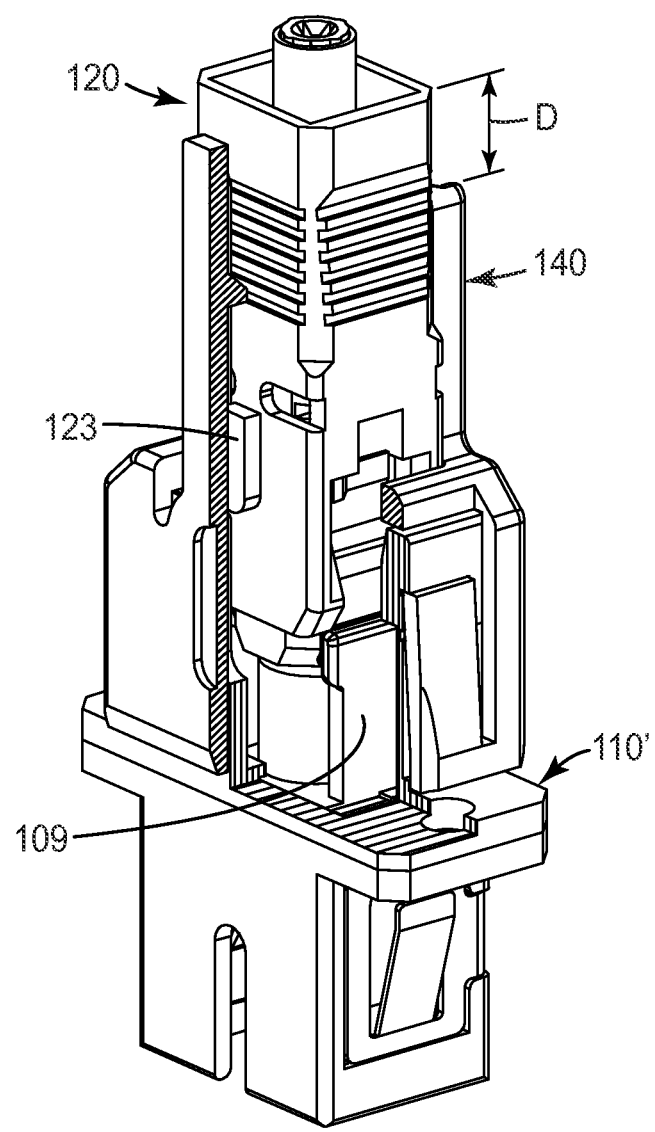
FIG. 5 is a view of an alternative optical coupling assembly, wherein the optical connector is in a disconnected position.

In an alternative embodiment the optical coupling may not include an internal shutter as shown in FIGS. 4A-4C. In this case, connector latches 109 within optical coupling 110' can hold the first optical fiber connector 120 in a disconnected position as shown in FIG. 5. Alternatively, a second stop may be positioned in the slot in the first arm of the parking lot adapter to hold the first optical fiber connector 120 in a disconnected position.

In an alternative embodiment, the coupling assembly 100 can include two parking lot adapters, one fitted to each side of the coupling. This embodiment will allow both the first and second connectors to be moved between the two stable positions (e.g. the connected position and the disconnected position).

Figures 6A, 6B:
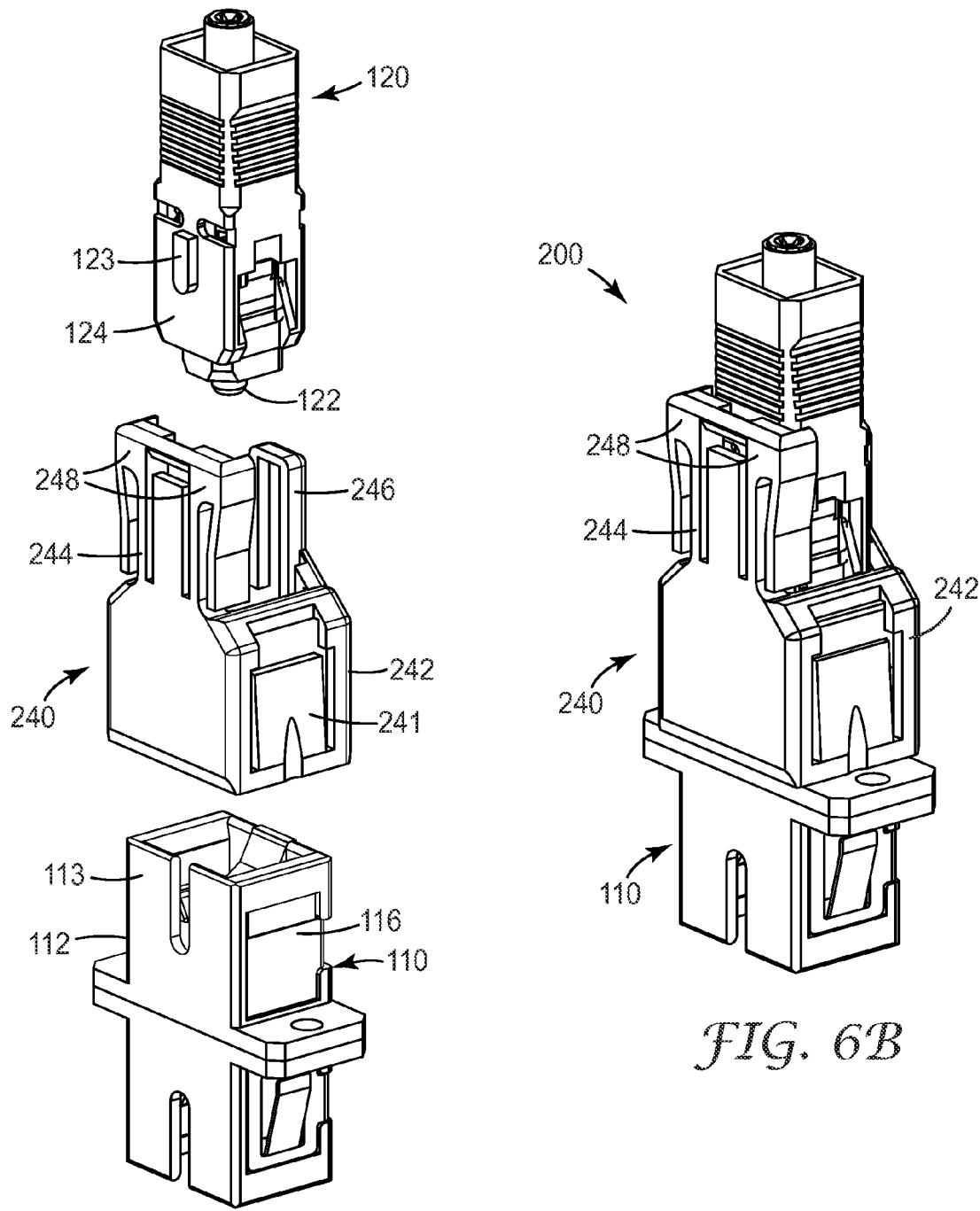
FIG. 6A is an exploded of an alternative embodiment of an exemplary coupling assembly that includes the parking lot adapter of the current invention.
FIG. 6B is the exemplary optical coupling assembly of FIG. 6A in an assembled condition.

An alternative exemplary coupling assembly 200 is shown in FIGS. 6A and 6B. Coupling assembly 200 has an alternative parking lot adapter 240. The parking lot adapter 240 is axially aligned with and fitted to a first side 113 of the optical coupling 110. The parking lot adapter 240 can include a base 242 that is configured to be slideably engaged over the first side 113 of optical coupling 110. The base includes a catch 241 which interacts with a detent 116 on the first side 113 of the coupling body 112 to secure the parking lot adapter 240 to the optical coupling 110.

A first arm 244 and a second arm 246 can extend axially away from the base 242 to support the first optical connector 120 when it is inserted into the parking lot adapter 240. In the exemplary embodiment shown in FIG. 6A, the first and second arms can extend from opposite sides of the base 242 such that the arms 244, 246 can aid in aligning the first optical connector as it is inserted into the parking lot adapter 240 and later optical coupling 110. In the exemplary aspect shown in FIGS. 6A, 6B and 7, the first arms 246 have two L-shaped wings 248 that extend laterally from the first arm. The L-shaped wings 248 can further aid in guiding the first optical connector 120 into the parking lot adapter 240. The L-shaped wings may also flex to allow the parking lot adapter to accommodate fiber connectors of different width (e.g. preterminated and field terminated connectors). The gap between the opposing arms permits the first optical connector to be grasped so that it can be moved between two stable positions.

Figure 7:
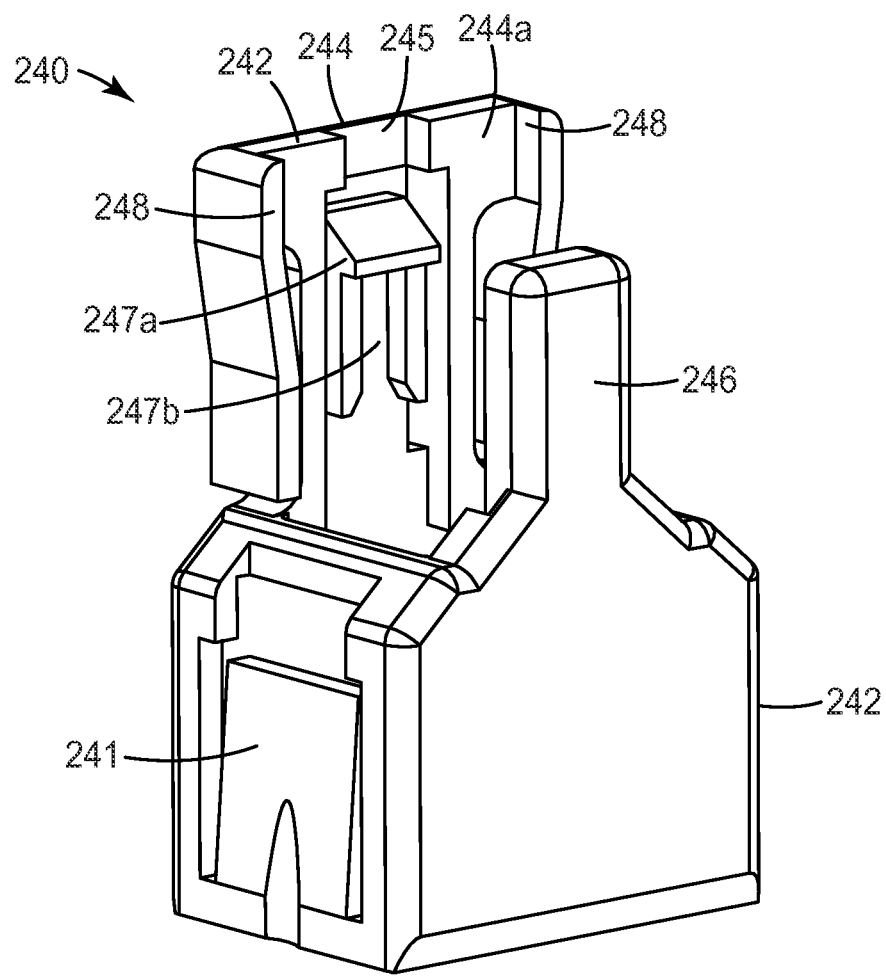
FIG. 7 is an alternative view of the parking lot adapter of FIG. 6A.

In an exemplary aspect shown in FIG. 7, first arm 244 can include a slot 245 extending longitudinally along the internal surface 244a of the first arm. The slot 245 can accommodate the key 123 (FIG. 6A) on the first optical fiber connector 120 to provide additional alignment of the optical connector as it is inserted into the coupling assembly. In addition, slot 245 in the first arm 244 can include one or more stops to hold the first optical connector 120 in the parking lot adapter and/or in one of a connected position and a disconnected position. The exemplary stop shown in FIG. 7 includes a barb 247a on the end of a resilient neck 247b to facilitate easy insertion of the first optical connector into the parking lot adapter.

The parking lot adapter of the current invention allows the convenient activation or deactivation of a fiber optic connection by simply changing the position of an optical fiber connector within the adapter, without having to completely remove the optical fiber connector from the coupling.

In addition to saving space within the coupling field, the parking lot adapter maintains the one to one pairing of two connectors relative to their coupling. In the traditional approach, the connector is physically moved to another location in the telecommunication enclosure in order to be stored when it is in a disconnected state. When the customer requests service, the craftsman must the locate the proper location for the connector in the coupling field in order to make the desired connection. The craftsman could make a mistake and move the connector of interest from the parking lot to the wrong coupling within the coupling field, or they could move the wrong connector from the parking lot to either the correct or incorrect coupling in the coupling field. Both of these situations would result in a failure to provide the customer with the requested service. Thus, the one to one pairing of the connectors to the couplings in the coupling field that is enabled by the parking lot adapter of the current invention can be advantageous.

Additionally, because the first optical connector is never removed from the parking lot adapter after installation, there is a reduced risk of contaminating the end of the ferrule of the first optical connector by dust or other contaminants. In conventional installations, the first connector has to be moved through open space from a separate parking lot to the connector field when the service connection is made which can result in contamination of the end face of the optical fiber. Because this situation does not occur when the exemplary parking lot adapter is used, there is a greater likelihood of a good service connection without having to clean the ferrules of the first and second fiber optic connectors.

Various modifications, equivalent processes, as well as numerous structures to which the present invention may be applicable will be readily apparent to those of skill in the art to which the present invention is directed in view of the present specification.

What is claimed is:

1. A coupling assembly for use in a telecommunication enclosure, the coupling assembly comprising: an optical coupling mounted within the enclosure wherein the optical coupling is configured to connect a first optical connector having a first ferrule end face and a second optical connector having a second ferrule end face; a parking lot adapter axially aligned with and fitted to a first side of the optical coupling and configured to receive the first optical fiber connector, wherein the first optical connector is insertable into the parking lot adapter and is movable between two stable positions within the parking lot adapter, wherein the stable positions consist of a connected position and a disconnected position, and wherein the disconnected position corresponds to a separation distance between the first ferrule end face and the second ferrule end face.

2. The coupling assembly of claim 1, wherein the parking lot adapter comprises a base configured to be slideably engaged over the first side of the optical coupling such that the optical first side of the optical coupling is disposed inside of the base of the parking lot adapter and first and second arms extending axially from the base away from the optical coupling to support the optical connector inserted in the parking lot adapter.

3. The coupling assembly of claim 2, wherein the first arm includes a slot extending longitudinally along an internal surface of the first arm, wherein the slot accommodates a key formed on the first optical fiber connector.

4. The coupling assembly of claim 3, wherein the slot in the first arm includes one or more stops to hold the first optical connector in one of a connected position and a disconnected position.

5. The assembly of claim 1, wherein the parking lot adapter further comprises an internal shutter.

6. The coupling assembly of claim 1, wherein the optical coupling includes an internal shutter.

7. The coupling assembly of claim 1, wherein the first optical fiber connector is mounted on the end of an optical fiber drop cable.

8. The coupling assembly of claim 1, wherein the first optical fiber connector is mounted on the end of an optical fiber patch cord.

9. The coupling assembly of claim 1, further comprising a second optical fiber connector inserted into the second side of the optical coupling.

* * * * *